United States Patent
Domingues

(10) Patent No.: US 7,250,187 B2
(45) Date of Patent: Jul. 31, 2007

(54) METHODS OF INCORPORATING ENCAPSULATED CHEMICAL LEAVENING AGENT INTO DOUGH INGREDIENTS, AND COMPOSITION SO PREPARED

(75) Inventor: David J. Domingues, Plymouth, MN (US)

(73) Assignee: General Mills Marketing, Inc., Minneapolis, MN (US)

( * ) Notice: Subject to any disclaimer, the term of this patent is extended or adjusted under 35 U.S.C. 154(b) by 771 days.

(21) Appl. No.: 10/224,886

(22) Filed: Aug. 21, 2002

(65) Prior Publication Data

US 2004/0037936 A1   Feb. 26, 2004

(51) Int. Cl.
*A21D 2/00* (2006.01)
(52) U.S. Cl. .................. 426/551; 426/496; 426/502; 426/504; 426/549
(58) Field of Classification Search ........... 426/549, 426/551, 496, 502, 504, 519
See application file for complete search history.

(56) References Cited

U.S. PATENT DOCUMENTS

| | | | |
|---|---|---|---|
| 3,649,304 A | 3/1972 | Fehr, Jr. et al. | |
| 3,767,421 A | 10/1973 | Gulstad et al. | |
| 3,930,032 A | 12/1975 | Harris et al. | |
| 4,022,917 A | 5/1977 | Selenke | |
| 6,261,613 B1 | 7/2001 | Narayanaswamy et al. | |
| 6,436,458 B2 * | 8/2002 | Kuechle et al. ............. | 426/128 |
| 2002/0001655 A1 | 1/2002 | Kuechle et al. | |

FOREIGN PATENT DOCUMENTS

| | | |
|---|---|---|
| EP | 0362181 | 4/1990 |
| EP | 0 868 850 A1 | 10/1998 |
| WO | WO 99/04640 | 2/1999 |

OTHER PUBLICATIONS

Hoseney, R. Carl, Chemical Leavening, Principles of Cereal, Second Edition, pp. 276-281 (1994).

* cited by examiner

*Primary Examiner*—Lien Tran
(74) *Attorney, Agent, or Firm*—Arlene L. Hornilla; Daniel Schulte

(57) ABSTRACT

Described are dough compositions and methods of preparing dough compositions, raw and baked, including preferred methods and compositions wherein chemical leavening agents are encapsulated by a degradable barrier material to control their reaction until a time during baking, wherein the encapsulated chemical leavening agents at least partially leaven the dough composition during baking, and wherein the encapsulated chemical leavening agents are uniformly incorporated into the dough composition or dough ingredients by methods that limit shear damage to the encapsulated particles.

2 Claims, 9 Drawing Sheets

METHODS OF INCORPORATING ENCAPSULATED CHEMICAL LEAVENING AGENT INTO DOUGH INGREDIENTS, AND COMPOSITION SO PREPARED

FIELD OF THE INVENTION

The invention relates to chemically leavened dough compositions, chemically leavened dough products, and methods for preparing the same, including methods of incorporating encapsulated chemical leavening agent into dough ingredients and chemically leavened dough compositions.

BACKGROUND

Chemical leavening agents in dough products are convenient and effective substances for leavening, as an alternative to yeast. Yeast as a leavening agent requires a time-consuming proofing step, during which the yeast metabolically produces a gas that leavens the dough composition. Because yeasts are temperature sensitive they can become inactive at oven temperatures. Proofing normally take place prior to baking, and is generally considered a relatively time-consuming step.

Chemical leavening systems can be conveniently used instead of metabolically active yeast. Chemical leavening systems include reactive ingredients that react to produce a gas for leavening the dough. Depending on the chemistry of the reactive leavening agents, the reaction can take place at any desired and suitable temperature, such as in an oven at baking temperature. Chemical leavening systems can eliminate the need for a time-consuming pre-bake, metabolic proofing step required by yeast-leavened products, because chemical leavening work during baking. As a convenience, stored dough products can often be placed directly into the oven without the time consuming step of allowing yeast to leaven the dough.

Chemical leavening systems, as they are often included in refrigerator stable dough compositions, include generally two chemical leavening agents that chemically react to produce a gas that leavens and expands (or "proofs") the dough. The two components typically include a basic component and an acidic component that react together to produce a gaseous reaction product that leavens the dough, preferably during baking.

While chemical leavening systems can be designed to react during baking, these components, in a dough composition, can sometimes react prematurely, at least to some degree, causing premature gas release and premature expansion of the dough composition. Premature reaction between the chemical leavening agents can occur if the two components come into contact with each other within the dough, generally at least in part because one or both of the components dissolves in the liquid component of the dough composition.

Different attempts have been made to prevent undesired, premature contact between chemical leavening agents. One technique is to encapsulate the chemical leavening components to produce a barrier between the chemical leavening agent and the liquid component of the dough composition. Another technique is to use chemical leavening agents that have low solubility at storage temperatures.

Encapsulated chemical leavening agents are known generally and include particles that contain particulates of solid chemical leavening agent coated or contained in a barrier material such as a room temperature solid fat. When encapsulated particles are included in a dough composition, incomplete or imperfect encapsulation of chemical leavening agent particulates or damage to the encapsulated particles can still allow premature contact between the chemical leavening agents and premature leavening of the dough composition. Premature leavening is undesirable, as it may occur during processing or during storage of a dough composition, e.g., after packaging, causing outgassing and expansion of the packaged dough product.

There is ongoing need for new chemically leavened dough compositions and methods for preparing them, especially dough compositions that have useful storage properties such as storage stability.

SUMMARY

The invention relates to chemically leavened dough compositions and methods of preparing them. More specifically, the methods and compositions involve encapsulated chemical leavening agent, e.g., an encapsulated acidic chemical leavening, an encapsulated basic chemical leavening agent, or both. The methods and compositions optionally also involve non-encapsulated chemical leavening agent. Examples of chemical leavening agents and encapsulated chemical leavening agents are known in the baking arts and typically involve one or more particulates of a solid chemical leavening agent coated with or enrobed in a solid barrier material. The barrier material can be any useful material for separating a chemical leavening agent from a dough composition, and can preferably be selected to melt or degrade at baking temperature to expose the chemical leavening agent to the bulk dough composition to allow reaction of the chemical leavening agents.

According to the invention generally, encapsulated chemical leavening agent can be used to control the timing of dough leavening, preferably so that minimal reaction and minimal gas production take place during mixing, packaging, and storing the dough composition. Quantities of unreacted chemical leavening agents are present in the dough composition, and if encapsulated are protected and undamaged, for normal leavening during baking, i.e., to leaven the dough composition during baking substantially by the chemical leavening ingredients.

Encapsulated chemical leavening agent particles have been found to be sensitive to shear. Barrier materials that form the coating portion of encapsulated chemical leavening agent particles may be fragile or brittle, allowing the coating or the particle to fracture or break upon experiencing shear; or if not fragile or brittle, the barrier materials may still become deformed or damaged by certain high shear conditions. Deforming or damaging the barrier coating or the encapsulated particle will expose chemical leavening agent particulates to the bulk dough composition in which the chemical leavening agent is contained, creating the possibility of contact (e.g., because of solubilization) of the chemical leavening agent and reaction with a counterpart chemical leavening agent to form a leavening gas.

Conventional methods of incorporating encapsulated chemical leavening agents into dough ingredients or dough compositions have not appreciated and accounted for damage that can occur to the encapsulated particles. Methods of manufacturing chemically leavened dough compositions often involve processing techniques such as high speed (high shear) mixing to combine dough ingredients, including any encapsulated chemical leavening agents. These techniques can damage the encapsulated chemical leavening agent particles and can cause the encapsulated particles or the barrier material coating to break, fracture, or otherwise allow the chemical leavening agent to become exposed from within the protective barrier material coating. Such damage allows the chemical leavening agent to react and cause premature leavening of the dough product.

Surprisingly, it has been found that the effect of damage to encapsulated chemical leavening agent particles is greater than would be expected. That is, even though encapsulated chemical leavening agents have been produced using sensitive barrier materials, the amount of damage imparted on these encapsulated agents during preparation of a dough composition, and the effects of that damage, have not been appreciated. According to the invention, careful incorporation of encapsulated chemical leavening agents by methods that reduce typically used amounts of shear and high speed mixing, can produce substantially improved dough compositions, to a degree that was not expected. Specifically, the amount of damage to encapsulated particles that occurs during typical high speed mixing methods can be significantly reduced by using reduced amounts of high speed mixing, or by using low shear methods, to substantially uniformly incorporate encapsulated chemical leavening agents into a dough composition. The amount of damage to the particles can be substantially reduced, and the stability of the chemically leavened dough composition can be substantially improved.

Thus, it has been surprisingly discovered that incorporating encapsulated chemical leavening agent particles into a dough composition or other dough ingredients using reduced amounts of shear (e.g., high speed or high shear for reduced amounts of time), or using low shear methods, can substantially limit damage to the encapsulated chemical leavening agents as compared to the damage that occurs using conventional high speed mixing techniques. The reduced shear prevents damage to encapsulated chemical leavening agent particles, maintains the protective barrier coating around chemical leavening agent particulates, and prevents the encapsulated chemical leavening agent from becoming exposed and reacting to prematurely leaven the dough composition. A result is improved stability of the dough composition compared to similar compositions made by methods that expose the encapsulated particles to greater amounts of shear.

The invention relates to methods for avoiding damage to encapsulated chemical leavening agent particles when the encapsulated particles are mixed or otherwise incorporated into other dough ingredients or a dough composition. According to the invention, the encapsulated particles are combined with one or more other ingredients of a dough composition using methods that limit or reduce the amount of shear to which the encapsulated particles are exposed, thereby limiting the damage that occurs to the encapsulated particles.

In certain specific embodiments, the invention can use high shear, high speed mixing to incorporate encapsulated particles into other dough ingredients, but according to the invention the amount of shear to which the encapsulated particles are exposed is reduced, limited, or minimized, by limiting the exposure time. In these embodiments, the amount of damaged encapsulated particles can preferably be kept to below 15 percent, preferably below 10 percent, of the total amount of particles, more preferably below 5 percent. Some amount of damage will be sustained by encapsulated particles during their preparation and handling, prior to damage that may occur while combining the encapsulated particles with dough ingredients as described herein; when the present description refers to percentages of damaged encapsulated particle, the amounts described include the damage from particle preparation and handling along with any damage that occurs by combining (e.g., mixing) the encapsulated particles into a dough ingredient or dough composition.

In other embodiments, high speed and high shear mixing techniques are avoided altogether and low shear mixing methods are used. In these low shear embodiments the amount of damaged encapsulated particles can preferably be kept to below 5 percent of the total amount of particles, more preferably below 3 percent.

A result of the invention is that the encapsulated chemical leavening agent particles can be uniformly distributed throughout a dough composition, but the particles suffer less damage from shear during the process compared to conventional higher shear methods. Reduced encapsulated particle damage limits the exposure of encapsulated chemical leavening agent to the dough composition, thereby preventing premature reaction between chemical leavening agents. A consequence can be improved stability of the dough composition during processing and storage.

The degree of damage to encapsulated particles that occurs during processing can be measured indirectly by different methods. One method is to measure the amount of gas produced by reaction of the chemical leavening agent ingredients prior to baking indirectly by measuring the amount of expansion experienced by the dough composition prior to baking (e.g., during packaged storage). Another method is to directly measure the amount of leavening gas, e.g., carbon dioxide, produced by the dough composition prior to baking.

Controlling, e.g., minimizing, reaction of the chemical leavening agents during processing and storage can result in the chemical leavening agents remaining protected and unreacted, and therefore available for reaction, during baking. For example, a dough product of the invention stored with refrigeration until just prior to baking can be unproofed and substantially unleavened, and can include sufficient amounts of unreacted chemical leavening agents so that substantial leavening of the dough will occur during baking. Most preferably, amounts of chemical leavening agents can be present in the dough composition after storage and prior to and during baking, so that a majority of or substantially all of the total amount of leavening that the dough experiences occurs during baking based on the reaction of the chemical leavening agents. In terms of specific volume, preferred dough compositions during storage and up to baking can have a raw specific volume of less than 1.6 cc/gram, preferably in the range of from about 0.9 to about 1.3 cc/gram. Preferred baked dough compositions can have a baked specific volume (BSV) of at least about 2 or 2.3, e.g., 2.5 or greater, up to or exceeding 3 or even 4 cc/g. Prior to baking, the dough composition can preferably have no more than 50% of $CO_2$ outgassed from the dough composition (based on the total amount of basic chemical leavening agent present in the dough composition) with a preferred amount being less than about 35%, 25%, or 10% of $CO_2$ outgassed from the dough composition prior to baking. The total amount of leavening (or outgassing) refers to any leavening that occurs during all processing steps, including preparation and packaging of the dough, storage, and also baking.

Dough compositions of the invention can be exceptionally stable during processing and storage. Stability can be measured by monitoring the volume of the dough composition and the amount of expansion of the dough composition that occurs prior to baking, and by monitoring the amount of leavening gas (e.g., carbon dioxide) that is produced prior to baking. Stability can be evident as a desirably low amount of expansion of the dough composition during various stages of processing, packaging, and storage, or by a desirably low volume of carbon dioxide evolution. Preferred dough compositions of the invention can be stable as packaged, preferably without the use of pressurized packaging, under refrigerated conditions for up to or exceeding 12 weeks at about 45° F.

Exemplary dough compositions of the invention can evolve less than 60, 50, or 40 cubic centimeters (cc) of carbon dioxide per 125 grams of dough over an 8 or 10 week period of time while stored at 45 degrees Fahrenheit, more preferably less than 25 or 20 cc of carbon dioxide per 125 grams over 8 or 10 weeks at 45 degrees F. In terms of expansion of a packaged dough product, with volume gain being a direct result of carbon dioxide outgassing, preferred packaged dough products may experience less than 25 percent, e.g., less than 15 percent, and most preferably less than 10 percent volume increase over a period of 5 weeks, 10 weeks, or 12 weeks at 45 degrees Fahrenheit.

As a comparison to compositions made using higher amounts of shear, an exemplary dough composition prepared according to the invention may exhibit a measured carbon dioxide evolution, after 6, 8, or 10 or more weeks at 45 F, that is 80 percent or less, preferably 60 percent or less, as compared to a similar composition prepared similarly but by exposing the encapsulated chemical leavening agent to 210 or more seconds of high speed (e.g., 72 rpm) mixing. As another example, a dough composition prepared according to the invention may exhibit a reduced measured carbon dioxide evolution, after 6, 8, or 10 or more weeks at 45 F, that is 50 percent or less as compared to a similar composition prepared similarly but by exposing the encapsulated chemical leavening agent to 210 seconds or more of high speed mixing.

Another advantage of using encapsulated chemical leavening agents generally and according to the methods and compositions of the invention is to avoid the need for pressurized packaging of dough compositions, or packaging that includes a pressure (gas) relief valve. For example, instead of pressurized packaging, which can be necessary to contain outgassed carbon dioxide and expansion of the dough composition that occur because of premature reaction of chemical leavening agents, non-pressurized packaging can be used according to the invention, because of the reduced outgassing and reduced expansion of the dough composition. Alternatively, a gas relief valve is not required to release leavening gas and avoid pressure build. In a related advantage, the use of low pressure packaging can make it easier to package fewer portions, e.g., of biscuits, per container, which can add an element of portion control to preferred packaged dough compositions of the invention. For example, a non-pressurized container may include subdivided portions of 1, 2, or 3 portions (e.g., biscuits) packaged to be substantially air tight but still not pressurized. More than one of those sub-divided portions can be included in a larger, non-pressurized package.

In one aspect the invention relates to a method of preparing a chemically leavened dough composition. The method includes combining dough ingredients into a mixture using a mixer and a method comprising a high speed mixing step, and uniformly distributing encapsulated chemical leavening agent particles into the dough ingredients by exposing the encapsulated chemical leavening agent to no more than 160 seconds of high speed mixing, to limit the amount of damage that occurs to the encapsulated chemical leavening agent during high speed mixing.

In another aspect the invention relates to a method of preparing a chemically leavened dough composition. The method comprises combining dough ingredients into a mixture using a mixer and a method comprising one or more high speed mixing steps, and uniformly distributing encapsulated chemical leavening agent particles into the dough ingredients so that the percentage of damaged encapsulated chemical leavening agent particles in the dough composition is below 10 percent, as calculated from the amount of carbon dioxide evolution of the dough composition.

In another aspect the invention relates to a method of preparing a chemically leavened dough composition. The method comprises combining dough ingredients into a dough ingredient mixture and uniformly distributing encapsulated chemical leavening agent into the dough ingredient mixture using a low shear method.

In still another aspect the invention relates to a dough composition comprising uniformly distributed encapsulated chemical leavening agent particles comprising chemical leavening agent encapsulated with a barrier material, wherein the percentage of damaged encapsulated chemical leavening agent particles is below 10 percent as calculated from the amount of carbon dioxide evolution of the dough composition.

The term "unproofed" refers to a dough composition that has not been processed to include any step intended to cause proofing or intentional leavening of the dough composition. For example, the dough composition may not have been subjected to a specific holding stage for causing the volume of the dough to increase by 10% or more. The raw specific volume (RSV) of an unproofed dough composition can typically be in the range from about 0.75 to about 1.6 cubic centimeters per gram (cc/g).

"Refrigeration-stable" means that a dough composition undergoes a sufficiently low amount of leavening during refrigerated storage to be a useful commercial or consumer dough product, e.g., there is not an excessive amount of leavening gas (e.g., carbon dioxide) production during storage (the RSV remains at an acceptable level, such as from 0.9 to 1.6 cc/gram), or the amount of leavening gas released from the dough composition does not exceed 0.46 cc/gram dough over a 12 week period of storage at about 45° F.

DETAILED DESCRIPTION

Encapsulated Chemical Leaveners

Figure 1:
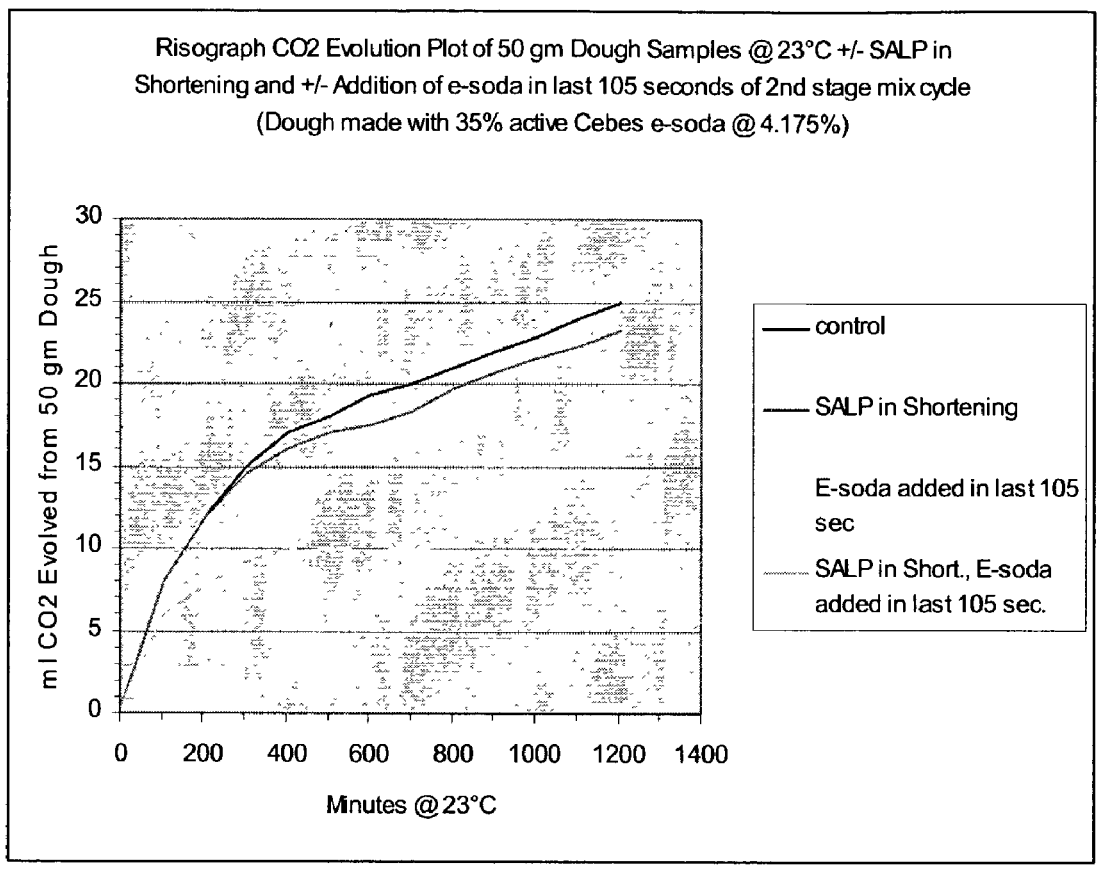
FIG. 1 is a graph illustrating gas evolution of $CO_2$ versus time for refrigerated dough compositions.

Chemically leavened dough compositions can be prepared from ingredients generally known in the dough and bread-making arts, typically minimally including flour, a liquid component such as oil or water, chemical leavening agent, and optionally additional ingredients such as a fat component, salt, sweeteners, dairy products, egg products, processing aids, emulsifiers, particulates, dough conditioners, added flavorings, and the like. The chemical leavening agents will typically include an acidic chemical leavening agent and a basic chemical leavening agent.

According to the invention, at least one chemical leavening agent, e.g., at least one of the basic chemical leavening agent or the acidic chemical leavening agent, is an encapsulated type of chemical leavening agent. Discussions of encapsulated chemical leavening systems are included in Assignee's copending U.S. patent application Ser. No. 09/945,204, filed Aug. 31, 2001, entitled "Chemical Leavened Doughs and Related Methods," the entire disclosure of which is incorporated hereby by reference. Encapsulating one or both of the chemical leavening agents provides separation between the leavening agent or agents and the rest of the dough composition to inhibit or prevent reaction of the chemical leavening agents until a desired time or condition of processing or use, at which condition the barrier material degrades and exposes the chemical leavening agent to the dough composition. Preferably, during preparation of the dough composition, packaging, and storage of the dough (normally at a refrigerated temperature), the barrier material maintains a separation between a chemical leavening agent and prevents reaction.

Dough compositions of the invention can also include non-encapsulated chemical leavening agent. Such chemical leavening agent can be included in the dough composition in any form, such as in the form of a particulate that does not include a coating of barrier material, e.g., in the form of a suspended solid or a dissolved chemical leavening agent present in the aqueous portion of the dough composition. If one of a combination of chemical leavening agents (e.g., the acidic chemical leavening agent) is present in the bulk dough composition as a non-encapsulated, suspended, solid particulate, or as chemical leavening agent dissolved in the aqueous phase, the other chemical leavening agent (e.g., the basic chemical leavening agent) is present in the form of encapsulated particles that include one or more particulates of that chemical leavening agent coated with, enrobed with, or suspended in barrier material. Thus, in exemplary embodiments of the invention, a refrigerated dough composition can contain a combination of solid particles of sparingly soluble acidic chemical leavening agent suspended in the aqueous phase of a dough composition, with a basic chemical leavening agent included in the form particulates coated with barrier material. In another embodiment, both the basic chemical leavening agent and the acidic chemical leavening agent can be present as encapsulated particles. In yet another embodiment, only the acidic chemical leavening agent may be encapsulated.

The terms "encapsulated chemical leavening agents," "encapsulated chemical leavening agent particles," or simply "encapsulated particles," refer to particles that include solid chemical leavening agent particulates covered in part, preferably substantially completely, by barrier material. Encapsulated particles are known in the baking arts, and include encapsulated particles sometimes referred to as "enrobed" or "agglomerated" particles. The barrier material forms a coating or shell around a single or multiple particulates of solid chemical leavening agent, separating the chemical leavening agent from a bulk dough composition. "Enrobed" particles generally include a single particulate of chemical leavening agent covered or coated by barrier material, and "agglomerate" particles generally include 2, 3, or more particulates of chemical leavening agent contained in a mass of barrier material (see below).

The barrier material can be any material that can be formed into a particle of encapsulated chemical leavening agent having the structure and properties described herein. Breakdown of the barrier material can preferably be controlled in a predictable, controllable manner, based on the temperature of the dough composition above the melting temperature of the barrier material, to cause the barrier material to melt and expose the encapsulated chemical leavening agent to the bulk dough composition where the barrier material can react to leaven the dough composition.

Barrier materials are preferably stable at and below certain threshold temperatures, and degrade above those temperatures, meaning that the barrier material can melt, disintegrate, break down, or otherwise be separated from the chemical leavening agent particulate or particulates at a desired temperature to expose the chemical leavening agent to a bulk dough composition in which the encapsulated particle is contained. Preferably, the barrier material can break down at a temperature that occurs early during baking, so the active chemical leavening agents contact each other, oftentimes dissolving in the liquid component of the dough composition, and then react and leaven the dough composition during baking, most preferably also before starch gelatinization or other physical changes to the dough composition occur that would limit or hinder the ability of the dough composition to expand.

Preferred barrier materials can be chosen to encourage release of enrobed or coated particulates of chemical leavening agent into a bulk dough composition, upon degradation of the barrier material. For example, it can be preferred that a barrier material melts at a baking temperature into a liquid form that can be separated from chemical leavening agent particulates to facilitate introduction of the particulates into the bulk dough composition. This means that when the barrier material melts, the barrier material and the particulates have a tendency to separate instead of a tendency to remain in the form of a melted barrier material coating surrounding a particulate or particulates of chemical leavening agent within the bulk dough composition. Separation of the chemical leavening agent particulates from the barrier material is important to disperse the chemical leavening agent throughout the bulk dough composition. The extent to which a melted barrier material is predisposed toward separating from particulates of chemical leavening agent can depend on factors such as the surface tension of the melted barrier material, the ratio (mass or volume) of active material to melted barrier material, the solid fat index of a fat-type barrier material, and the melting point of the barrier material, all of which can be chosen to facilitate separation.

A preferred melting point for the barrier material can be a melting point that causes a barrier material to take the form of a stable, hydrophobic solid at dough preparation, packaging, and storage temperatures, and that causes the barrier material to break down (e.g., melt) during baking. If oven temperature during baking is generally about 300 to 500° F., preferred melting points of barrier materials are generally lower, e.g., greater than 100° F., so that a melting point is something higher than refrigerated storage or room temperature, and is a temperature that the dough composition experiences during baking, but is not necessarily the temperature of the set point of the oven during baking. Particularly preferred melting points can be within the temperature range experienced by the dough composition during early stages of baking, such as from about 100° F. to about 200° F. While other temperatures can also be found to be useful, melting temperature can preferably be chosen to be below the starch gelatinization temperature typically from about 100 to about 150° F., with exemplary melting temperatures of a barrier material being in the range from about at least 100° F. up to about 140° F., preferably at least about 110° F. up to about 130° F.

Specific examples of barrier materials can include materials that are hydrophobic and that also exhibit desired properties such as desired mechanical properties, surface tension, solid fat index, and/or a desired melting point. With respect to mechanical properties, preferred barrier materials can preferably be relatively strong, durable, and flexible, to withstand processing of the dough composition without being fractured, e.g., broken or otherwise affected to expose chemical leavening agent particulates, e.g., the barrier material is preferably not overly brittle. At the same time, a barrier material may be miscible with the bulk dough composition upon melting, although does not need to be.

Exemplary types of barrier materials include hydrophobic materials such as fats and emulsifiers. Specific examples include oils such as hydrogenated and partially hydrogenated vegetable oils including soybean oil, cotton oil, palm kernel oil, canola oil, or any other oils, especially high lauric acid triglyceride-containing oils, any of which may be used alone or in mixtures with each other or with other barrier materials. Synthetic analogs of any of these may also be useful. Synthetic analogs include synthetic materials with fatty acid compositions like the vegetable oils above, or other useful oils, including, preferably, a positional geometry of fatty acids esterified on a tri-glyceride.

Preferred fat-type barrier materials can be those that exhibit a high solid fat index ("SFI"), which is the ratio of solid fat to liquid fat in a barrier material at a certain temperature. A barrier material having a high solid fat index will generally better protect a coated particulate, because the barrier material is solid at a relatively higher temperature and is more stable during mixing and processing due to greater strength and integrity. Exemplary high solid fat index values can be at least about 50% at 75° F., preferably at least about 70% at 80° F. Fat-type barrier materials having such an SFI are commercially available, as will be understood by the skilled artisan. Examples include high lauric acid fats such as LauriCal (canola) from Cargill, Neutresca (fractionated palm kernel) from Aarhus, and Cebes (fractionated palm kernel) from Aarhus.

Chemical leavening agent included in an encapsulated particle can be any type of chemical leavening agent, generally in the form of a solid particulate, and may preferably be chosen based on various factors, for example based on solubility. Certain chemical leavening agents, typically basic chemical leavening agents, can tend to be relatively more soluble in an aqueous phase of a bulk dough composition at preparation, packaging, or storage temperatures. Such relatively soluble chemical leavening agents can preferably be included in a dough composition of the invention in the form of an encapsulated particle.

Generally, a basic chemical leavening agent can be selected to cooperate with ingredients of the dough composition, including the acidic chemical leavening agent, the barrier material, and other ingredients, to give control of the timing of reaction between the chemical leavening agents as described herein. The composition, size, and physical form of the basic chemical leavening agent can be selected to cause the basic chemical leavening agent to be stable at processing and storage temperatures, to become fully incorporated in the bulk dough composition, e.g., hydrated, during baking, and to give substantially uniform distribution during baking for reaction with the acidic chemical leavening agent. Factors that encourage desired behavior can include one or more of the amount, particle or particulate size, and solubility of the basic chemical leavening agent or a basic chemical leavening agent particulate.

The basic chemical leavening agent can be any substance that can react in a bulk dough composition with an acidic chemical leavening agent to produce a leavening gas, usually carbon dioxide. Useful basic chemical leavening agents are generally known in the dough and bread-making arts, with examples of useful basic chemical leavening agents including reactive basic materials such as soda, sodium bicarbonate, ($NaHCO_3$), potassium bicarbonate ($KHCO_3$), ammonium bicarbonate ($NH_4HCO_3$), etc. These and similar types of basic chemical leavening agent are generally soluble in an aqueous phase of a dough composition at processing or refrigerated storage temperature. Such relatively soluble basic chemical leavening agents can preferably be included in the dough composition in the form of an encapsulated particle.

Acidic chemical leavening agent can be selected to cooperate with the other ingredients of the dough composition, including the basic chemical leavening agent, barrier material, and the other ingredients of the bulk dough composition, to control the timing of reaction between the chemical leavening agents as described. The composition, solubility, amount, size (if a particle or particulate), and physical form of the acidic chemical leavening agent can be selected to cause the acidic chemical leavening agent to be stable (e.g., sparingly soluble) at processing temperatures (e.g. from about 40 to about 60 degrees Fahrenheit), to be stable at refrigerated storage temperatures, and to become fully incorporated in the bulk dough composition, e.g., dissolved in the bulk dough, and preferably to achieve acceptably uniform distribution during baking for reaction with the basic chemical leavening agent. Factors that encourage desired behavior can include one or more of the amount, particle or particulate size, and solubility.

Examples of useful acidic chemical leavening agents are known in the dough and bread-making arts, with just a few examples including leavening phosphates such as SALP (sodium aluminum phosphate), SAPP (sodium acid pyrophosphate), and monosodium phosphate; monocalcium phosphate monohydrate (MCP), anhydrous monocalcium phosphate (AMCP), dicalcium phosphate dihydrate (DCPD) glucono delta lactone (GDL), sodium aluminum sulfate (SAS). Commercially available acidic chemical leavening agents for use according to the invention can include those sold under the trade names: Levn-Lite® (SALP), Pan-O-Lite® (SALP+MCP), STABIL-9® (SALP+AMCP), PY-RAN® (AMCP), and HT® MCP (MCP). Of these, some have low solubilities at processing and refrigerated storage temperatures, and some have relatively higher solubilities.

Optionally, either alternatively or in addition to encapsulated basic chemical leavening agent, acidic chemical leavening agent can also be included in encapsulated chemical leavening agents. Or, especially if having a low solubility at processing and refrigerated storage temperatures and higher solubility at baking temperatures, the acidic chemical leavening agent can be present in the dough composition as a non-encapsulated particle that more readily dissolves at baking temperatures. As yet another option, the acidic chemical leavening agent may be dissolved in the dough composition at storage and processing temperatures, although this embodiment may be less preferred than solid encapsulated or sparingly soluble non-encapsulated acidic leavening agents.

Acidic chemical leavening agents that exhibit a low solubility in the dough composition (e.g., the aqueous phase) at processing and refrigeration conditions, e.g., can be sparingly soluble below baking temperatures, can be preferred. A low solubility chemical leavening agent, even if not completely encapsulated, or if part of an encapsulated particle that is somehow fractured or broken during processing, will still exhibit low solubility during processing and storage and will be less likely cause premature leavening.

Low solubility also prevents any exposed acidic chemical leavening agent from dissolving too quickly delays reduction in pH of the bulk dough composition. A low pH can lead to negative effects such as acid hydrolysis of proteins, which can adversely affect flavor. A low pH may also prevent desired browning of the dough during baking. As such, an acidic chemical leavening agent with relatively low solubility at below baking temperatures can be useful, even if the acidic chemical leavening agent is included as an encapsulated particle.

In addition to low solubility of an acidic chemical leavening agent at below baking temperatures, high solubility at baking conditions can be preferred to facilitate dissolution of the acidic chemical leavening agent during baking, which facilitates uniform distribution of the acidic chemical leavening agent in the bulk dough composition and reaction with the basic chemical leavening agent. Some especially preferred acidic chemical leavening agents can exhibit a low solubility at processing or refrigerated storage temperatures (e.g. from about 40 to about 55 degrees Fahrenheit) and can therefore remain, in part, in solid suspension until baking, where at a higher temperature (e.g., a baking temperature in the range form 100° F. to 200° F.) the acidic chemical leavening agent becomes substantially soluble, (e.g., becomes at least 90% dissolved).

Preferred acidic chemical leavening agents include those that exhibit solubility behaviors similar to SALP and SAPP (most preferably SALP). Specifically, SALP and SAPP exhibit reaction rates that are relatively slow at comparatively low temperature ranges, such as below about 35–40° C. This indicates low solubility at that temperature range. The same acidic chemical leavening agents, however, have relatively faster reaction rates, showing adequate solubility, at higher (e.g., baking) temperatures. The solubilities of exemplary acidic chemical leavening agents are: SALP (37.7 kcal/mole); dicalcium phosphate dihydrate (37.8 kcal/mole) and SAPP (27.5, 33.7 kcal/mole).

A different way to characterize preferred acidic chemical leavening agents is to consider the "Relative Reaction Rate." See R. Carl Hoseney, *Principles of Cereal Science and Technology*, $2^{nd}$ ed. pp. 276–81 (1994). (See Table 1 at page 280 of Hoseney specifies the "Relative Reaction Rates" of various leavening agents.) Preferred acidic chemical leavening agents (especially in embodiments where the acidifying agent is not separated from the bulk dough composition) can have a Relative Reaction Rate, as measured by Hoseney, of at least 4, which specifically includes sodium aluminum phosphate, sodium aluminum sulfate, and dicalcium phosphate dihydrate.

The individual chemical leavening agents can be included in the dough composition in respective amounts that will be understood to be useful to leaven the dough composition to a normally leavened baked dough product. The amount of a chosen basic chemical leavening agent to be used in a dough composition can be sufficient to react with the included acidic chemical leavening agent to release a desired amount of gas for leavening, thereby causing a desired amount of expansion or leavening of the dough product. Because the basic chemical leavening agent and the acidic chemical leavening agent work in cooperation, each chemical leavening agent should be included in an amount designed to work with the included amount of the other chemical leavening agent.

Typical amounts of basic chemical leavening agent (not including the weight of any barrier material encapsulant) can be in the range from about 0.25 to about 2 parts by weight, based on 100 parts dough composition, with ranges from about 0.75 to about 1.5 parts by weight basic chemical leavening agent per 100 parts dough composition sometimes being preferred.

The acidic chemical leavening agent can be added in an amount sufficient to neutralize the basic component, i.e. an amount that is stoichiometric to the amount of basic chemical leavening agent, with the exact amount by weight being dependent on the particular acidic chemical leavening agent that is chosen. Typical amounts of acidic chemical leavening agent such as SALP can be in the range from about 0.25 to about 2 parts by weight acidic chemical leavening agent per 100 parts by weight dough composition, with ranges from about 0.25 to about 1.5 parts by weight sometimes being preferred. In some instances, slightly less than a stoichiometric amount of acidic chemical leavening agent can be used, because less than all of a basic ingredient may be released (from an encapsulated chemical leavening particle) during baking, in which case the amount of acid used can match the estimated or expected amount of base released.

The size of encapsulated particles, and the size of a chemical leavening particulate or particulates therein, can be any that will provide useful and preferably substantially uniform incorporation of the leavening agent into the dough composition when desired.

When the barrier material is a layer of a fat-type barrier material, it has been observed that a relatively thinner layer of barrier material can improve release of the core particulate into the bulk dough composition. Relatively thinner coatings of barrier material are thought to facilitate introduction of the core particulate into the bulk dough composition, by tending to allow separation of the core particulate from a melted barrier material, based on surface energy effects. This is in contrast to thicker barrier material coatings, which may form a relatively immobile melted mass of barrier material within a bulk dough composition, surrounding the particulate and maintaining separation of the core particulate from the bulk dough composition.

Separation of a core particulate from the degraded barrier material can be further encouraged by selecting the barrier material to have a surface tension in its melted form that will facilitate separation of the melted barrier material from the core particulate. While wishing not to be bound by theory, the following factors are believed to encourage separation of chemical leavening agent particulates from an encapsulate particle. A ratio of the mass of barrier material to the mass of chemical leavening agent particulate is preferably sufficiently low (e.g., $\leq 0.5$), and the chemical leavening agent particulates can be sufficiently large enough (45–75 microns) to enable melted barrier material to form spherical droplets upon melting, and to enable the chemical leavening agent particulates to migrate and protrude at the melted barrier material/water interface such that the protruding crystals exceed the surface tension of the melted barrier material and are ejected into the aqueous continuous phase of the dough composition. Combinations of these properties and behaviors facilitate release and hydration of the chemical leavening agent particulates, preferably within a time period during the baking cycle such that effective leavening will occur while the dough is able to expand (e.g., prior to starch gelatinization).

There are at least two distinct types of encapsulated particles that include barrier material and chemical leavening agent. One is an "enrobed particle," which typically includes a single particulate of chemical leavening agent (the particulate is also sometimes referred to herein as the "core") surrounded by or "enrobed" in a layer of barrier material.

With respect to total encapsulated particle size of enrobed particles it has been observed that enrobed particles (that include basic chemical leavening agent) of certain size can sometimes cause localized effects throughout a baked dough composition. Too large of an encapsulated particle can result in a failure to distribute chemical leavening agent evenly throughout a dough composition during baking, causing localized effects such as variations in pH and spotting (with enrobed basic chemical leavening agent). Spotting means that a cooked dough product displays one or more of a dark brown spotting of the outer crust surface upon baking, or that interior crumb displays yellow spotting. Preferably, the size of an enrobed chemical leavening agent particulate can be sufficiently small, and the enrobed chemical leavening agent can be sufficiently soluble during baking, to allow adequately uniform distribution of the chemical leavening agent throughout the dough composition during baking to avoid localized areas of high pH, to allow uniform and consistent baking and color development throughout the dough.

As an exemplary range, the size of chemical leavening agent particulate inside of the enrobed particle may typically be from about 30 to about 100 micrometers, with the range from about 45 to about 75 micrometers being preferred. (The term "particulate" refers to particulates of chemical leavening agent, e.g., the "core" particulate or particulates of enrobed particles or agglomerate particles, covered by a barrier material to form an "encapsulated particle." The term "encapsulated particle" refers to an agglomerate or an enrobed particle that contains one or more chemical leavening agent particulate and barrier material coating.)

A second general type of encapsulated particle is the type known as "agglomerate particles," (or "congealed" particles), which are encapsulated particles that include a greater number of smaller particulates of chemical leavening agent suspended in a mass of barrier material. The size and number of chemical leavening agent particulates in an "agglomerate" type encapsulated particle can typically be from about 2 to about 100, or more. More can be included, depending on size. The size of core particulates in an agglomerate particle can be generally in the range from about 2 to about 50 µm.

The overall size of an enrobed or agglomerated encapsulated particle, including the one to several particulates coated with barrier material, can preferably be in the range from about 50 to about 500 micron, preferably 100 to 420 micron (meaning that the particles will pass through a sieve having mesh openings of less than or equal to 420 microns, but not through a sieve with mesh openings of less than or equal to 100 microns). Encapsulated particles having a size of greater than 100 micron can be preferred to reduce or minimize diffusion of water into the encapsulated particle; encapsulated particles of diameter less than about 420 micron can be preferred to reduce spotting or other localized effects (especially for enrobed soda encapsulates).

The relative amounts of chemical leavening agent and barrier material in an encapsulated particle can be any useful amounts. The relative amount by weight of chemical leavening agent to total encapsulated particle weight is sometimes referred to as "activity." Preferred activities are those that can facilitate at least partial separation of the chemical leavening agent from the barrier material, to expose the chemical leavening agent to the bulk dough composition. Preferably, the relative amount of barrier material to chemical leavening agent is sufficient to substantially separate the chemical leavening agent from the bulk dough in the form of a coating of barrier material covering particulates of chemical leavening agent. Particularly useful activity ranges may differ for enrobed versus agglomerate encapsulated particles. Activities of at least 30 percent or 40 percent may be generally useful, up to about 60, 65, or 70 percent. For enrobed particles, preferred weight ratios or activities of chemical leavening agent to total weight of a encapsulated particle can be in the range from about 40 to about 65 percent, more preferably from about 45 to about 55 percent chemical leavening agent per total weight encapsulated particle. For agglomerate particles, preferred weight ratios or activities of chemical leavening agent to total weight of a encapsulated particle can be in the range from about 30 to about 50 percent, more preferably from about 35 to about 45 percent chemical leavening agent per total weight encapsulated particle.

Encapsulated particles can be prepared by methods known in the baking and encapsulation arts.

An example of a method for producing enrobed particles is the use of a fluidized bed. According to this method, core particulates and barrier material are concurrently introduced into a fluidized bed. As the two materials are present in the fluidized bed, the barrier material becomes coated on the surface of the core particulate. The longer the particulate is present in the fluidized bed, the thicker the coating of barrier material becomes. Typical particles can include 1, 2, or 3 particulates per encapsulated particle. Preferably, the process successfully places a coating of the barrier material over the entire surface of the core particulates. On the other hand, the process is not always perfect, and some core particulates may be imperfectly coated, meaning that they are not fully enrobed but a portion of the surface of the core particulate remains exposed. Some amount of such imperfectly coated core particulates can be acceptable, but the amount is preferably minimized. Those familiar with in the art of encapsulation will be well acquainted with fluidized bed and congealing processes.

Agglomerate particles can be formed using a congealing process. According to this method, a mixture of particulates and melted barrier material can be prepared into a sprayable liquid. The sprayable liquid can then be sprayed into a cooling environment where droplets of the sprayable liquid mixture are caused to congeal into agglomerate particles.

Some considerations with respect to the agglomerate-type particles are that portions of the chemical leavening agent particulates will often be present and exposed at the surface of the agglomerate particles. As a result, the chemical leavening agent can advantageously release very well into the bulk dough composition as the barrier material breaks down. On the other hand, because chemical leavening agent will be present at the surface, chemical leavening agent (e.g., basic chemical leavening agent) will be exposed to the bulk dough composition where it may dissolve at processing or refrigerated storage temperatures into the water of the dough composition, and react with the other chemical leavening agent (e.g., acidic chemical leavening agent).

As for the other ingredients of a chemically leavened dough composition, they can be as follows, or as otherwise useful for preparing chemically leavened dough compositions.

The flour component can be any suitable flour or combination of flours, including glutenous and nonglutenous flours, and combinations thereof. The flour or flours can be whole grain flour, flour with the bran and/or germ removed, or combinations thereof. Typically, a dough composition can include between about 30% and about 70% by weight flour, e.g., from about 45% to about 60% by weight flour, such as from about 50 to 55 weight percent flour.

Examples of liquid components include water, milk, eggs, and oil, or any combination of these. Preferably, the liquid component includes water, e.g., in an amount in the range from about 15 to 35 weight percent, although amounts outside of this range may also be useful. Water may be added during processing in the form of ice, to control the dough temperature in-process; the amount of any such water used is included in the amount of liquid components. The amount of liquid components included in any particular dough composition can depend on a variety of factors including the desired moisture content of the dough composition. Typically, liquids can be present in a dough composition in an amount between about 15% by weight and about 35% by weight, e.g., between about 20% by weight and about 30% by weight.

The dough composition can optionally include an egg product, e.g., for flavoring. Examples of egg products include fresh eggs, egg substitutes, dried egg products, frozen egg products, etc. The amount of egg products, if used, can be between about 0.1 percent by weight and about 35 percent by weight. The egg products may be in a dried form or a liquid form. If a liquid form of egg product is used, the amount of liquid component is adjusted to take into account the moisture content resulting form the liquid egg product.

The dough composition can optionally include dairy products such as milk, buttermilk, or other milk products, in either dried or liquid forms. Alternatively, milk substitutes such as soy milk may be used. If used, dairy products can be included as up to about 25 percent by weight of the dough composition, e.g., between about 1 percent and about 10 percent of the dough composition. If a dried dairy product is used, it is not considered to be part of the liquid component identified above; if a liquid form of a dairy product is used, the amount of other liquid components, if any, can be adjusted accordingly.

The dough composition can optionally include fat ingredients such as oils and shortenings. Examples of suitable oils include soybean oil, corn oil, canola oil, sunflower oil, and other vegetable oils. Examples of suitable shortenings include animal fats and hydrogenated vegetable oils. If included, fat is typically used in an amount less than about 20 percent by weight, often less than 10 percent by weight of the dough composition. If liquid oils are used as fat, the amount of other liquid components can be adjusted accordingly. One of ordinary skill will recognize that the chosen amounts and types of fats included can be adjusted depending on the desired texture of the dough product.

The dough composition can optionally include one or more sweeteners, either natural or artificial, liquid or dry. If liquid sweeteners are used, the amount of other liquid components can be adjusted accordingly. Examples of suitable dry sweeteners include lactose, sucrose, fructose, dextrose, maltose, corresponding sugar alcohols, and mixtures thereof. Examples of suitable liquid sweeteners include high fructose corn syrup, malt, and hydrolyzed corn syrup. Often, dough compositions include between about 2% by weight and about 15% by weight, e.g., from about 5% by weight to about 10% by weight sweetener.

The dough composition can further include additional flavorings, for example, salt, such as sodium chloride and/or potassium chloride; whey; malt; yeast extract; yeast (e.g., inactivated yeast); spices; vanilla; etc.; as is known in the dough product arts. The additional flavoring can typically be included in an amount in the range from about 0.1 percent to about 10 percent of the dough composition, e.g., from about 0.2 percent to about 5 percent of the dough composition.

The dough composition can optionally include particulates such as raisins, currants, fruit pieces, nuts, seeds, vegetable pieces, and the like, in suitable amounts.

As is known, dough compositions can also optionally include other additives, colorings, and processing aids such as emulsifiers, strengtheners (e.g., ascorbic acid), preservatives, and conditioners. Suitable emulsifiers include lecithin, mono- and diglycerides, polyglycerol esters, and the like, e.g., diacetylated tartaric esters of monoglyceride (DATEM) and sodium stearoyl-2-lactylate (SSL).

Conditioners, as are known in the dough products art, can be used to make the dough composition tougher, drier, and/or easier to manipulate. Examples of suitable conditioners can include azodicarbonamide, potassium sulfate, L-cysteine, sodium bisulfate, and the like. If used, azodicarbonamide is preferably not present in an amount more than 45 parts per million.

Preparation of a Dough Composition

According to the invention, the above listed dough ingredients, in addition to any other optional ingredients, as desired or useful, can be combined in a manner that reduces or prevents damage to encapsulated chemical leavening agent that may occur from shear imparted on the encapsulated particles while combining the ingredients. Barrier materials that form the coating portion of encapsulated chemical leavening agent particles may be fragile or brittle, allowing the coating or the particle to fracture or break upon experiencing substantial shear forces; or if not fragile or brittle, the barrier materials may still become deformed or damaged by certain shear conditions. Deforming or damaging the barrier coating or the encapsulated particle will expose encapsulated chemical leavening agent to the bulk dough composition in which the chemical leavening agent is contained, creating the possibility of contact between the chemical leavening agents and premature reaction between the two to form a leavening gas, e.g., during processing or refrigerated storage.

According to the invention, shear sensitive encapsulated chemical leavening agent particles can be incorporated and substantially uniformly distributed in a dough composition in using techniques and steps that consider the amount of damaging shear to which the encapsulated particles are exposed, and then incorporate the encapsulated particles into the dough composition with substantially uniform distribution while attempting to minimize the amount of damage to the encapsulated particles that occurs during processing. According to an embodiment of the invention, encapsulated particles can be incorporated into a dough composition by the use of low shear techniques that reduce or limit the amount of damage caused to the encapsulated particles. Alternatively, the encapsulated particles can be exposed to a limited amount of higher shear, e.g., the encapsulated particles can be incorporated into a dough composition using a certain amount of high speed mixing, but the total amount of high speed mixing to which the encapsulated particles are exposed can be limited, e.g., based on the amount of time the encapsulated particles are subjected to high the high mixing speed.

Incorporating encapsulated chemical leavening agent particles into dough compositions or other dough ingredients using reduced amounts of shear, such as high speed or high shear for reduced amounts of time, or using low shear methods, according to the invention, limits or prevents damage to the encapsulated chemical leavening agents as compared to the damage that occurs using conventional high speed mixing techniques. The reduced shear prevents damage to encapsulated chemical leavening agent particles, maintains the protective barrier coating over chemical leavening agent particles, and prevents the coated chemical leavening agent from becoming exposed to the dough composition where it may react.

A chemical leavening agent that is "substantially uniformly distributed" throughout a dough composition means that the amount of chemical leavening agent included in the dough composition is sufficiently well distributed throughout the dough composition that the dough composition can be stored and baked to exhibit commercially useful uniformity, baked specific volume, color, and flavor properties, for a chemically leavened dough product.

The terms "high speed" and "high shear" are used in a manner consistent with the terms' understood meanings to refer to mixing methods that impart a relatively high amount of shear upon ingredients being mixed, sufficient to cause substantially uniform distribution of ingredients. "High speed" mixing generally refers to the use of standard bowl-type mixer with reciprocating, rotating, or spinning "beaters" or other mechanically impinging utensils that reciprocate or rotate at speeds in excess of 36 revolutions per minute (rpm), e.g., greater than 40 rpm, or from 50 to 72 rpm.

Generally, low speed and low shear mixing steps are used to wet out dry ingredients, to combine ingredients without causing splash or dust formation, or both. Mixing at low speeds may not allow substantially uniform distribution of ingredients, even if used for a long period of time. Examples of low shear mixing steps include mixing steps in a bowl mixer at speeds below 36 rpm, e.g., for less than about 300 seconds or for a time to roughly combine or wet dry ingredients. Other examples of low shear mixing steps include sheeting, folding, lapping, kneading, enrobing, and rolling steps, which can cause damage to very low amounts of encapsulated particles, e.g., less than 5 or 3 percent.

A dough composition (raw) can be prepared according to the invention using certain mixing techniques that are known in the dough and dough product arts, for example according to one or more of the following steps, not to the exclusion of other steps, and not necessarily in the recited order.

Mixing

Generally, flour and any other dry ingredients can be combined with a fat component, and other dough ingredients can be mixed in using any of a variety of methods and/or addition orders, as are known in the dough-making art, to form a raw dough composition.

Mixing may be performed in commercially available and well-known equipment, for example a horizontal bar mixer with a cooling jacket (e.g., a 2500 lb. horizontal bar mixer from Oshikiri in Japan). The dough ingredients can be added separately or in combinations, and can be mixed at one or more speeds, sometimes in stages, until a proper consistency is achieved and all ingredients are substantially uniformly dispersed in a dough composition. A total of from about 5 minutes to about 45 minutes high and/or low speed mixing time may be useful, although the low end of this range (or even lower) is commercially preferred. Optionally ingredients or combinations of ingredients can be combined sequentially over two or more mixing stages.

Typical methods of preparing dough compositions include one or more high speed mixing steps that produce sufficiently high shear for a sufficient temporal length to uniformly distribute dough ingredients in a dough composition, within a commercially reasonable period of time. The one or more high speed mixing steps may, for example, be for periods of from 200 to about 400 seconds, and at a speed of from 36 to about 72 rpm generally. If encapsulated particles were to be mixed into the dough ingredients for the entire amount of such a high speed mixing step, the encapsulated particles could be subjected to a certain amount of shear that would damage at least a portion of the encapsulated particles, e.g., to cause greater than 15 percent damage of encapsulated particles in the dough composition.

Oftentimes, methods of incorporating ingredients into a dough composition include two or more separate addition stages and two or more separate high speed mixing steps, including a final high speed mixing step that occurs last among the high speed mixing steps. (The "final" high speed mixing step is not necessarily the last or final step of the method of preparing the dough composition. And, if only a single high speed mixing step is used, that single high speed mixing step is considered the "final" high speed mixing step.) Typically, a final high speed mixing step may produce enough shear that if encapsulated particles were mixed into the dough ingredients for the entire time of the final high speed mixing, the encapsulated particles would be subjected to an amount of shear that would cause at least a substantial portion of the encapsulated particles of the dough composition, e.g., greater than 15%, to be damaged.

According to an embodiment of the invention, encapsulated chemical leavening agent particles are incorporated into and uniformly distributed throughout a dough composition by a method that subjects the encapsulated particles to an amount of shear that is less than the amount of shear to which the encapsulated particles would be subjected to if subjected to an entire final high speed mix period used to prepare a dough composition. The amount of shear imparted on the encapsulated particles according to the invention can be an amount that would occur by exposing the encapsulated particles to only a portion of a final high speed mix period. For example the encapsulated particles can be subjected to an amount of shear that would occur by exposing the encapsulated particles to 90 percent, 75 percent, or 50 percent or less of the final high speed mix period, while the encapsulated particles still become substantially uniformly distributed. The amount of shear to which the encapsulated particles are exposed during a high speed mixing step can be controlled based on the amount of time over which the encapsulated particles are included in the high speed mixing step, i.e., by controlling when during the high speed mixing step the encapsulated particles are added, or by the speed of the mixing mechanism. In preferred embodiments, encapsulated particles can be mixed into dough ingredients for a period of less than 160 seconds of high speed mixing, e.g., less than 150 seconds or 110 seconds, preferably at a speed of 36 to 75 rpm, e.g., from 40 or 60 rpm to 70 or 72 rpm.

In certain preferred embodiments of the invention, two mixing stages can be used to combine dough ingredients into a dough composition. A first stage can be used, e.g., to hydrate flour and initiate development of the dough (i.e., gluten development). A second stage can be used for incorporation of minor ingredients and to allow further development. The total of the dough ingredients can be added in the different stages with different amounts of mixing and at one or more different mixing speeds, to provide a uniform distribution of the ingredients in a dough composition. In these or other embodiments, encapsulated chemical leavening agent particles can be added to limit shear damage, while still providing uniform distribution, preferably in a second mixing stage, and preferably during only a portion of a high speed mixing step of the second stage (i.e., during a portion of the final high speed mixing step).

If more than one high speed mix period is involved in a method of the invention, it can be preferred to incorporate encapsulated chemical leavening agent only during the final high speed mix period, e.g., a latter portion of the final high speed mix period. This final high speed mix period can preferably be performed after most or all dough ingredients have been added. In one specific embodiment, a first mixing stage can combine dry ingredients and shortening. In a preferred method, dry ingredients such as one or more types of flour can be first combined with water and ice in an iced mixing bowl. Shortening can be melted or softened, and then added to the dry ingredients. The mixture can be mixed at slow speed, e.g., from about 25 to about 35 rpm, for a desired amount of time, e.g., less than a minute. Then the mixture can be mixed at high speed, e.g., from about 65 to about 75 rpm, for a longer period of time, e.g., less than five minutes or less than four minutes. In a second mixing stage, fines can be added such as sugar, salt, non-encapsulated chemical leavening agent, as well as additional shortening in the form of shortening chips, and other optional ingredients. The total first and second stage ingredients can be mixed at slow speed, e.g., from about 25 to about 35 rpm, for a relatively short time, e.g., less than a minute, and then mixed at high speed, e.g., from about 65 to about 75 rpm, for a longer time, e.g., less than five minutes.

In this exemplary two-stage embodiment, encapsulated chemical leavening agent (basic encapsulated chemical leavening agent, acidic chemical leavening agent, or both) can be added to the other dough ingredients in a way that limits damage to the encapsulated particles. For example, the encapsulated particles may be added after some portion of the second stage high speed mixing step has been completed, so that the encapsulated particles are mixed at high speed for only a portion of the total high speed mixing period. This reduced amount of high speed mixing will reduce the amount of damaging shear to which the encapsulated particles are exposed, and still substantially uniformly distributes the encapsulated particles into the dough composition. Specifically, after a portion of the second stage high speed mixing period has been completed, e.g., about half of the total intended high speed mix period (e.g., 1.5 to 2.5 minutes), the encapsulate particles can be added. Optionally, the mixing speed can be slowed to slow speed for a period sufficient to gradually add the encapsulated particles. Then the mixing speed can be increased again to high speed for a time sufficient to uniformly incorporate the encapsulated particles into the other ingredients, but for a period of high speed mixing that exposes the encapsulated particles to less damage than would the full high speed mixing period, preferably a time that does not result in damage to more than 15 percent of the encapsulated particles.

Optionally, in embodiments that include a non-encapsulated chemical leavening agent (e.g., a non-encapsulated acidic chemical leavening agent), the inventive method can include the step of incorporating the non-encapsulated chemical leavening agent into softened or melted shortening (fat), and then combining the shortening and non-encapsulated chemical leavening agent with other ingredients in the mixer. Mixing the non-encapsulated chemical leavening agent can be done by any desired high or low speed mixing method. This technique can also stabilize the resulting dough composition by covering the non-encapsulated chemical leavening agent with a hydrophobic layer that prevents hydration and dissolution of the chemical leavening agent until re-melting of the fat.

The target temperature for the resulting dough composition is generally between about 50 F and about 80 F (as described, this can be controlled at least in part by the use of ice). A farinograph and extensigraph can optionally be used to verify the flour/water ratio and dough composition development, as well as the physical and mechanical properties of the dough composition generally.

Sheeting, Folding, Lapping

The dough composition can be further processed as desired to prepare a final dough composition. Depending on the type of final dough composition certain steps of sheeting, folding, lapping, enrobing, or cutting and shaping, can be used to form a particular shape and form of dough composition product.

In some embodiments of the invention, the dough composition can be sheeted to transform a mass of a dough composition, after mixing, into a relatively thin, substantially flat, continuous web or film that can be further processed by one or more of sheeting, kneading, lapping, rolling, folding, enrobing, cutting, shaping, and filling, to produce a desired dough product.

In an embodiment of the inventive method, the encapsulated particles can be incorporated into the other dough ingredients following the mixing step or steps, using one or more of a low shear steps such as sheeting, rolling, lapping, folding, or enrobing. Specifically, as an alternative or in addition to adding one or more encapsulated particles during mixing, as described above, one or more encapsulated particles can be incorporated into the dough composition by one or more low shear steps of sheeting, rolling, lapping, folding, or enrobing. According to these techniques, acidic or basic encapsulated leavening agents, or both, can be applied and preferably uniformly distributed over a surface of the dough composition prior to or during a low shear processing step, e.g., by adding encapsulated particles at the beginning of or between one or more of the low shear steps. A dough composition can be sheeted, folded, enrobed, or lapped, multiple times, in a manner and sufficiently to distribute the encapsulated particles substantially uniformly throughout the finally processed dough composition.

To initiate a sheeting step, a dough composition can be pre-sheeted to form a continuous sheet of dough composition. The actual thickness of the dough composition sheet at this point is not critical as long as the thickness is consistent as the dough composition enters the sheeter. According to this embodiment of the invention, all or only a portion of a basic or acidic encapsulated chemical leavening agent, or both, if not already incorporated into the dough composition, can be added to the dough composition by placing the encapsulated particles on the surface of the pre-sheeted dough composition, preferably in a relatively uniform, distributed manner.

The dough composition, in the sheeting apparatus, is compressed to form a sheeted dough composition of a desired thickness. Sheeting generally involves rolling the pre-sheeted dough composition through at least one set of rollers. The use of more than one set of rollers can be preferred, for gradually increasing the size (area) of the dough composition sheet and decreasing the thickness.

Sheeting steps can be interspersed with other processing steps, such as folding steps, enrobing steps, or lapping steps. Enrobing includes performing one or multiple folding operations on the sheeted dough composition, optionally and preferably with rolling steps in-between. Enrobing can involve one or multiple folding processes. For example a sheeted dough composition may be folded in two, by folding in half, once or multiple times. A sheeted dough composition may be folded into thirds (a three-fold), one or multiple times. Or a sheeted dough composition may be folded into four sections (a four-fold), one or multiple times. Any combination of two-fold, three-fold, or four-fold steps can be used to substantially uniformly distribute encapsulated particles throughout a dough composition.

Lapping steps involve changing the direction in which the dough composition is worked. Lapping in these doughs reorients the polymers, reducing dough composition snapback. Lapping steps may also be used to uniformly incorporate encapsulated particles.

The encapsulated particles can be applied to the surface of the sheeted dough composition in one or multiple portions. The particular amount of any encapsulated particles applied to a surface of a dough composition can depend on factors relating to the exact encapsulated particles and the exact dough composition involved. The amount applied to a surface during any single step should be sufficient to fully incorporate the full amount of encapsulated particles into the dough composition without requiring an excessive number of steps. On the other hand, the amount applied to a sheeted surface should not interfere with processing of the dough composition. For example, the amount of encapsulated particles applied to a surface of a sheeted dough composition should not unduly hinder or prevent a dough composition from annealing upon folding. Annealing is important to avoid a layered composition. To prevent annealing, a total amount of encapsulated particles to be added during folding, can preferably be added in multiple portions, between folding or enrobing steps.

By one or more of these low shear steps, encapsulated particles applied to a surface of the sheeted dough composition can become uniformly incorporated into the dough composition.

The presheeter, lappers, and rollers of the sheeter may be coated with release agents to cause release of the dough composition without deforming. Release agents can include, for example, flours, starches, and the like. Preferably, a light, even, and consistent coating of release agent can be applied to rollers or lappers. After removal from the rollers, a dough composition sheet may be dedusted to remove any excess release agents.

The inventive methods and compositions can be used to prepare any type of dough compositions, and can be particularly useful for refrigerated dough compositions useful for preparing baked dough compositions including biscuits, bread sticks, crescent rolls, sweet rolls, etc.

Also, while the dough compositions are described with respect to a particular leavening system, the dough compositions can include additional ingredients that cause leavening of the dough product. This means that in addition to the described chemical leavening agents used with the barrier material, other leavening agents may also be used if desired. Still, the invention has the advantage of allowing use of only the described chemical leavening system, including chemical leavening agents separated by a barrier material. Preferred dough compositions of the invention do not require or include any other leavening agents. This means that leavening agents of the dough composition of the invention may consist essentially of or consist of only chemical leavening agents separated by barrier material, e.g., encapsulated basic particles, and particles of an acidic chemical leavening agent that is substantially insoluble or sparingly soluble in a bulk dough composition at relatively low temperatures but that will dissolve at higher temperatures, e.g., temperatures that the bulk dough composition will experience during baking.

The dough composition can be packaged and sold in a form that can be refrigerator stable. An example of a packaging configuration would be a plastic tube or pouch containing a stack of individual portions of a dough composition such as biscuits. Any materials and techniques can be used for the packaging. Typical such biscuit products are often packaged and sold in pressurized containers such as cardboard cans. The inventive dough has the advantage of being capable of being packaged without taking special measures to pressurize the packaging.

Exemplary packaging that may be useful is non-pressurized pouch/cup packaging. The container can preferably be a plastic that acts as an adequate oxygen barrier, to promote storage and freshness. Additionally, it can be preferred that the package be sized to include at least a small amount of headspace, or space for the carbon dioxide to expand into. That is, because the dough product of the invention may experience a slight amount of expansion or outgassing during refrigerated storage, the packaging should accommodate such a small amount of outgassing, preferably without a substantially noticeable change in the packaging appearance. The use of headspace, or packaging the dough in a package that is slightly larger than needed, optionally with slight vacuum during the packaging process, allows such expansion or outgassing.

Also, purging the product and packaging to remove oxygen, for example using a purge of nitrogen gas, can preferably be used to control graying. Preferred amounts of oxygen in a packaged dough product can be below about 0.20 micromoles of $O_2$ per square centimeter of dough surface area.

EXAMPLES

Example 1

Effect of Time of Addition of Encapsulated Basic Chemical Leavening Agent (E-soda) and Coating SALP with Shortening on Low Pressure Dough Performance Objectives: To assess the effect of 1) delaying the addition of e-soda until the last 105 seconds of the 2nd stage mix cycle and 2) coating SALP with shortening on low pressure dough stability and performance vs shelf life time.

Background: Encapsulated soda is shear sensitive. By minimizing e-soda exposure to shear forces upon mixing, one should be able to reduce the extent of encapsulate damage in the low pressure dough. Additionally, low pressure dough pH decline is the result of the solubilization of SALP into the aqueous phase. By coating SALP with shortening prior to mixing in the dough, one might be able to retard the rate of solubilization of the SALP and thereby prevent, or limit, dough pH decline over shelf life time.

Materials & Methods:

Four dough formulations were prepared based in the following ingredients and two-stage mixing sequence.

| Ingredient | I.S. | % | gm |
|---|---|---|---|
| 1st Stage | | | |
| flour | 16018 | 38.97 | 1169.1 |
| flour | 15980 | 8.8 | 264 |
| water | | 17.615 | 528.45 |
| ice | | 9.075 | 272.25 |
| shortening | 18810 | 5.375 | 161.25 |
| xanthan gum | 11555 | 0.13 | 3.9 |
| 2nd Stage | | | |
| Enrobed encapsulated soda (≦420 microns), 40% active in partially hydrogenated palm kernel oil | 1196 | 4.175 | 125.25 |
| shortening chips | 18804 | 7.49 | 224.7 |
| Sugar | 19202 | 5.42 | 162.6 |
| SALP | 16428 | 1.67 | 50.1 |
| Salt | 18206 | 1.28 | 38.4 |
| TOTAL | | 100 | 3000 |

Spiral Mixer Process

First Stage Mix
1) Soften/melt shortening
2) Combine first stage dry ingredients in an iced mixing bowl.
3) Add melted shortening.
4) Mix slow for 30 seconds.
5) Mix high for 180 seconds.

Second Stage Mix
6) Cut-in second stage fines and added shortening chips.
7) Mix slow for 30 seconds.
8) Mix high for 210 seconds.

Sheeting
9) Sheet dough to 13 mm, 4 fold and rotate 90°, then sheet to 13 mm.
10) Cut 63+/−3 gm biscuits.

Packaging
11) Add two biscuits per pouch and flush with 100% N2. Material 8.5"×12" high barrier film (seal to 4–5" height)
Run 1: Mix as outlined; mix e-soda for the full second stage low and high speed mixing steps, at 30 seconds slow followed by 210 seconds fast.
Run 2: Add SALP to melted shortening and mix in stage 1.
Run 3: Add e-soda after 105 seconds mixing on stage 2. Mix e-soda at 30 seconds slow followed by 105 seconds fast, to complete second stage mix cycle.
Run 4: Add SALP to melted shortening and e-soda as described in Run 3.

Analysis (Every Three Weeks)
Package volume—used submersion/volumetric displacement method.
Headspace $CO_2$ and $O_2$—used a PBI Dansenser, CheckMate 9900 (139 Harristown Road, Glen Rock N.J. 07452 USA).
Dough pH—direct measurement of dough
RSV and BSV (samples baked at 375° F. for 15–16 minutes)—measurements recorded using a TexVol Instruments BVM-3 bread volume measurer (Box 45, 260 40 Viken, Sweden).

Delaying the addition of e-soda to the dough until after partial completion of the high speed mixing step of the second stage, i.e., until the last 105 seconds of the 2nd stage mix cycle, effectively reduced the amount of shear damage to the encapsulate as evidenced by a reduction in total cc $CO_2$ outgassed and a decrease in package volume gain over shelf life time. With the exception of data collected at week 9, dough made with e-soda added in the last 105 seconds of the 2nd stage mix cycle, on average, outgassed 20–25 cc $CO_2$ less compared to dough samples in which e-soda was added at the beginning in the 2nd stage mix cycle.

Addition of SALP to the shortening, in conjunction with adding e-soda to the dough in the last 105 seconds of the 2nd stage mix cycle, resulted in a reduction in average package volume of approximately 10 cc at any given time during the 12 week study (it would appear that adding the SALP to the shortening prior to dough incorporation retarded $CO_2$ outgassing).

The pH of dough made with e-soda added in the last 105 seconds of the 2nd stage mix cycle experienced a rapid decline from about 5.6 to 3.6 within the first 3 weeks of storage. This decline in pH is the result of some solubilization of SALP in conjunction with minimal soda leakage from the e-soda. In the dough samples in which the e-soda was exposed to more shear stress and hence damage, pH values remained at >6.0 through 9 weeks of storage (soda released from damaged encapsulate effectively neutralized the SALP and buffered the dough pH).

FIG. 1 illustrates how delaying addition of e-soda until the last 105 seconds of the 2nd stage mix cycle significantly reduced (>50%) the amount of $CO_2$ gas released from the dough (less shear damage=more stable encapsulate).

Figure 2:
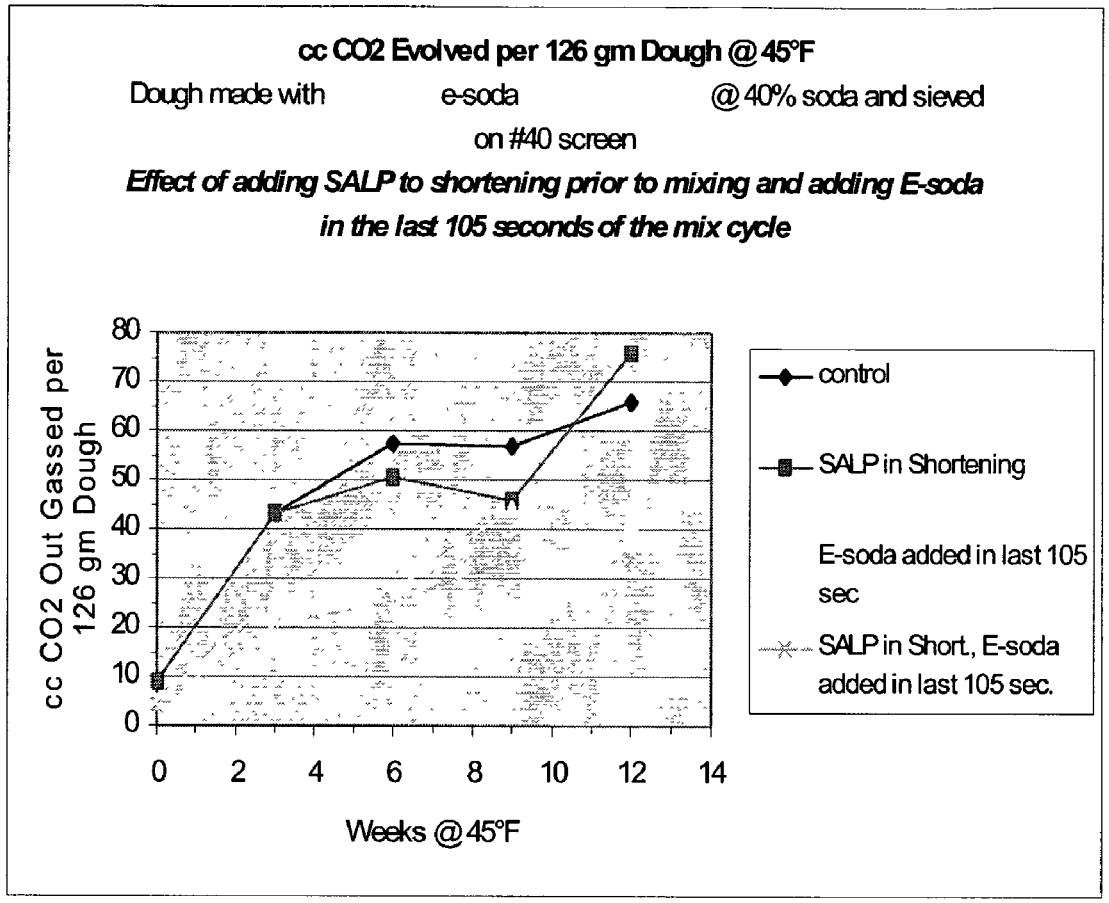
FIG. 2 is a graph illustrating gas evolution of $CO_2$ versus time.

FIG. 2 illustrates how delaying addition of e-soda until the last 105 seconds of the 2nd stage mix cycle effectively reduced the shear damage to the encapsulate as evidenced by the reduction in $CO_2$ outgassed from the dough over shelf life time. With the exception of data collected at week 9, dough made with e-soda added in the last 105 seconds of the 2nd stage mix cycle, on average, outgassed 20–25 cc less compared to dough samples in which e-soda was added earlier in the 2nd stage mix cycle (i.e., compared to dough exposed to more shear stress). Addition of SALP to the shortening in conjunction with adding the e-soda in the last 105 seconds of the second stage mix cycle slightly reduced the amount of $CO_2$ outgassed from the dough over shelf life time (approximately 5 cc $CO_2$ less).

Figure 3:
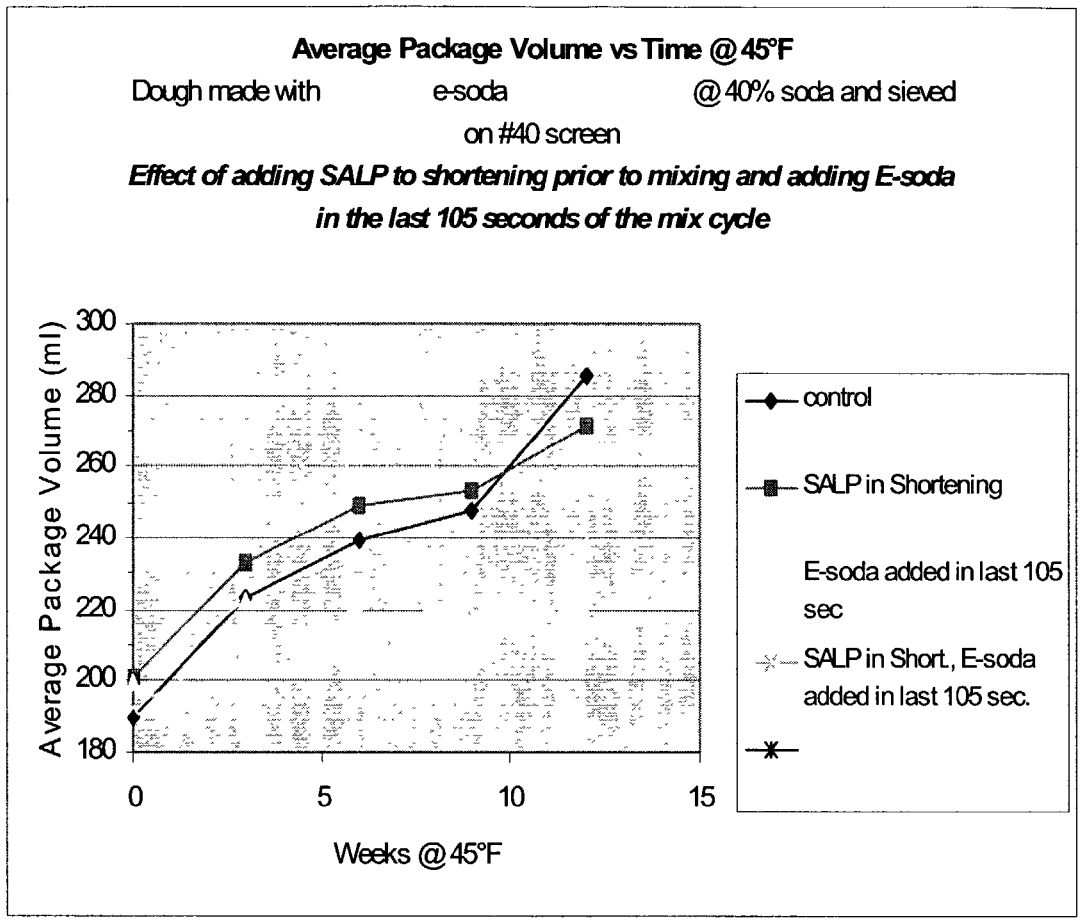
FIG. 3 is a plot of volume expansion versus time for dough compositions.

FIG. 3 shows that given that package volume gain is the direct result of $CO_2$ outgassing, the plot of average package volume vs shelf life time is comparable to the plot of cumulative cc $CO_2$ outgassed vs shelf life time. Addition of e-soda in the last 105 seconds of the 2nd stage mix cycle effectively diminished the shear damage to the encapsulate, hence less $CO_2$ outgassing and reduced package volume gain vs shelf life time. Addition of SALP to the shortening, in conjunction with adding e-soda to the dough in the last 105 seconds of the 2nd stage mix cycle, resulted in a reduction in average package volume of approximately 10 cc at any given time during the 12 week study (it would appear that adding the SALP to the shortening prior to dough incorporation retarded $CO_2$ outgassing).

Figure 4:
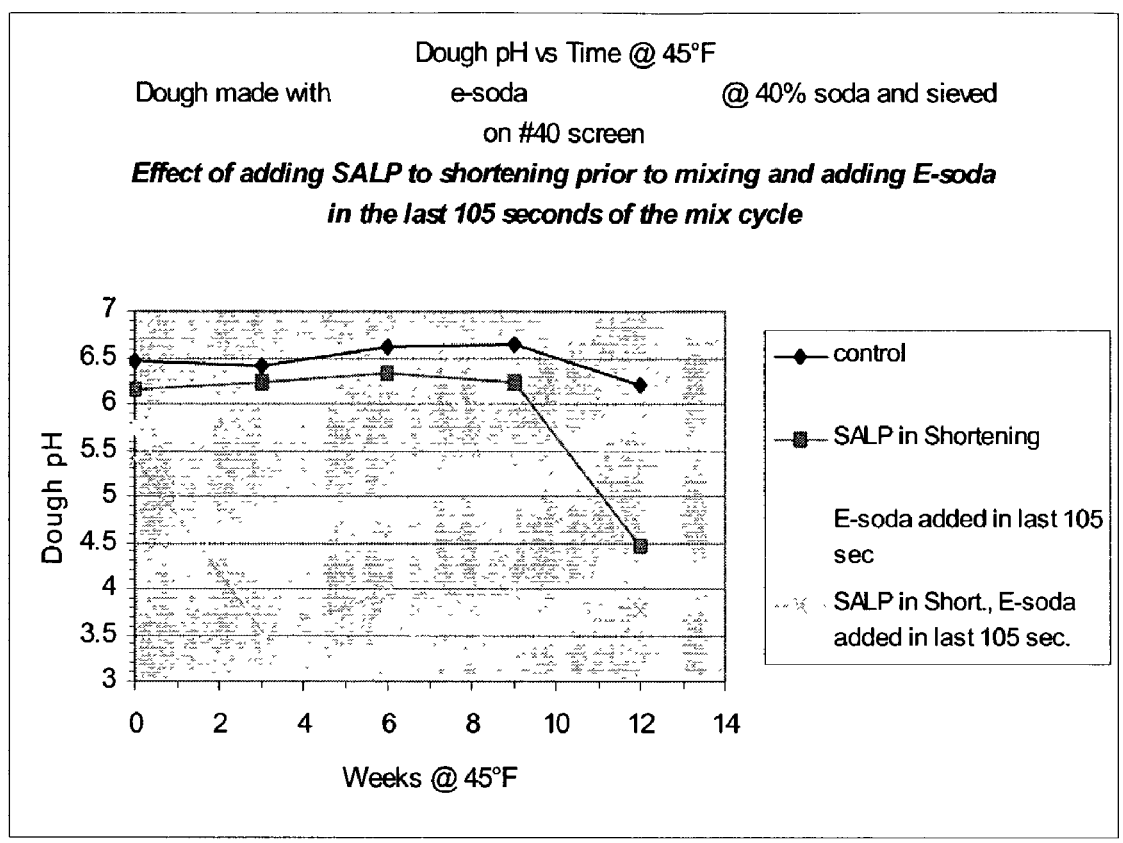
FIG. 4 is a plot of pH versus time for dough compositions.

FIG. 4 shows that the pH of dough made with more intact c-soda (i.e., made with e-soda added in the last 105 seconds of the 2nd stage mix cycle) experienced a rapid decline in pH from about 5.6 to 3.6 within the first 3 weeks of storage. This decline in pH is the result of the solubilization of SALP plus minimal soda leakage from the encapsulate into the dough. In the dough samples in which the encapsulate was exposed to more shear stress and resulting damage, pH values remained at >6.0 through 9 weeks of storage. The pH of the dough did not decline because soda released from the damaged encapsulate effectively neutralized for samples in which SALP was added to the shortening and the e-soda was exposed to longer mix times (not enough soda released to effectively neutralize the SALP after week 9).

Figure 5:
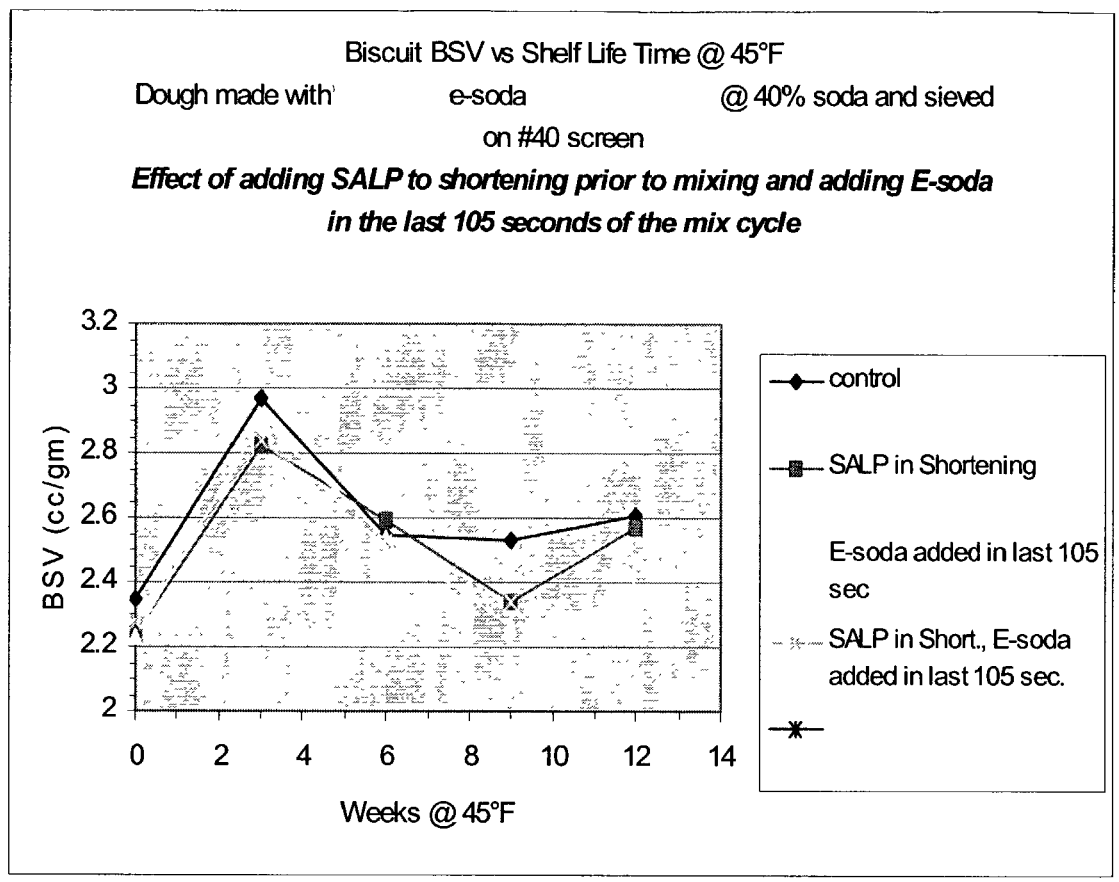
FIG. 5 is a plot of baked specific volume versus time.

FIG. 5 shows BSV values that are fairly comparable through week 6. At week 12, sample made with e-soda exposed to longer mix time appeared to have slightly higher BSV values compared to samples in which the e-soda was added in the last 105 seconds of the 2nd stage mix cycle.

Example 2

Addition of Encapsulated Particles During Low Shear Sheeting and Folding

Example 2 includes the following four different dough compositions, runs 1, 2, 3, and 4, were prepared from the same ingredients, as follows.

This is a process by which encapsulated soda is distributed into a dough composition post mixing, during low shear process steps involving sheeting and folding. Specifically, encapsulated soda is topically applied to the surface of a sheeted dough pad prior to folding and sheeting. By incrementally adding encapsulated soda in such a manner, one effectively distributes/layers the e-soda throughout the dough while minimizing shear damage.

When encapsulated soda is added to the dough during conventional mixing, the particles are exposed to shear forces that result in encapsulate damage/breakage. Damaged/broken encapsulates readily hydrate in refrigerated dough resulting in premature release of $CO_2$ gas upon reaction with leavening acids. Adding encapsulated soda to the dough in a less shear intensive sheeting step reduces the extent of encapsulate damage associated with conventional mixing. To date we have experienced a 50% reduction in premature release of $CO_2$ gas from dough in which encapsulated soda was added upon sheeting compared to addition via conventional mixing.

| Ingredient | I.S. | % | Gm |
|---|---|---|---|
| 1st Stage | | | |
| flour | 16018 | 38.97 | 3897 |
| flour | 15980 | 8.8 | 880 |
| water | | 17.615 | 1761.5 |
| ice | | 9.075 | 907.5 |
| shortening | 18810 | 6 | 600 |
| xanthan gum | 11555 | 0.13 | 13 |
| 2nd Stage | | | |
| Enrobed encapsulated soda, 47% active in partially hydrogenated palm kernel oil | 1196 | 3.55 | 355 |
| shortening chips | 18804 | 7.49 | 749 |
| sugar | 19202 | 5.42 | 542 |
| SALP | 16428 | 1.67 | 167 |
| salt | 18206 | 1.28 | 128 |
| TOTAL | | 100 | 10000 |

Make two 10K batches of dough:
Run 1 & 2—split 10K batch into two 4000 gm batches
Run 3 & 4 (omit e-soda)—split 9645 gm batch into two 3858 gm batches Spiral Mixer Process First Stage Mix
1) Soften/melt shortening
2) Combine first stage dry ingredients in an iced mixing bowl.
3) Add melted shortening.
4) Mix slow for 30 seconds.
5) Mix high for 180 seconds.

Second Stage Mix
6) Cut-in second stage fines and added shortening chips.
7) Mix slow for 30 seconds.
8) Mix high for 210 seconds.

Run 1: Sheet 4K dough to 9–10 mm, 4 fold and rotate 90°, then sheet to 13 mm.

Run 2: Sheet 4K dough to 9–10 mm, 4 fold and rotate 90°, then sheet to 9/10 mm, 4 fold and rotate 90°, then sheet to 13 mm.

Run 3: Sheet 3858 gm dough to 13 mm and add 142 gm e-soda to the pad, 4 fold and rotate 90°, then sheet to 13 mm. (Run 3 dough delaminated upon cutting and was not used (too much e-soda, dough would not anneal).

Run 4: 1) Sheet 3858 gm dough to 9–10 mm, distribute 29 gm e-soda to dough surface (distribute uniformly), 3 fold, rotate 90° 2) Sheet to 9–10 mm, distribute 29 gm e-soda uniformly onto dough surface, 4 fold, rotate 90° 3) Repeat step 2 above three times.

Packaging: 7.5"×12" pouch made with a nylon laminate "high barrier" Currwood film. Each sample pouch contained two biscuits placed side by side flushed with either N2 or Argon gas.

The sample pouches were stacked horizontally/lengthwise in plastic sample trays and stored at 45° F.

Analysis (Every Three Weeks)
Package volume—used submersion/volumetric displacement method Headspace $CO_2$ and $O_2$—used a PBI Dansenser, CheckMate 9900 (139 Harristown Road, Glen Rock N.J. 07452 USA)

Dough pH—direct measurement of dough

RSV and BSV (samples baked at 375° F. for 15–16 minutes)—measurements recorded using a TexVol Instruments BVM-3 bread volume measurer (Box 45, 260 40 Viken, Sweden).

The Example shows that the amount of outgassing (by $\geq 50\%$) from low pressure refrigerated dough can be reduced by adding the e-soda to the dough post mixing during sheeting and folding steps. In this particular study, dough in which e-soda was added during the full second stage high speed mix cycle outgassed approximately 43 cc $CO_2$ after 12 weeks storage at 45° F. while dough in which the e-soda was introduced post mixing upon sheeting outgassed approximately 15 cc $CO_2$ over the same time period.

Figure 6:
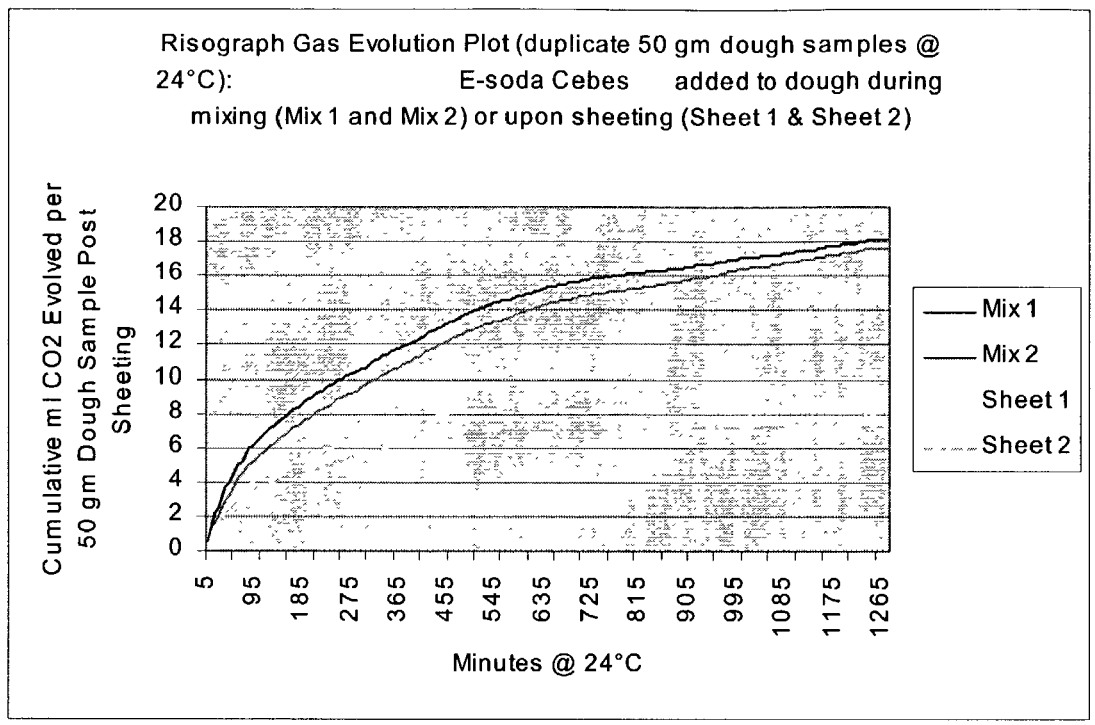
FIG. 6 is a graph illustrating gas evolution of $CO_2$ versus time for refrigerated dough compositions.

FIG. 6 shows that adding encapsulated soda particles post mixing, during the sheeting step, reduced the cumulative amount of $CO_2$ outgassed from the dough upon incubation at 24° C. by approximately 55% over a 21 hour period of time. Adding the encapsulate to the dough in a shear intensive mixing step resulted in greater encapsulate damage and more outgassing compared to incorporating the encapsulate into the dough post mixing in a less shear intensive sheeting step.

Figure 7:
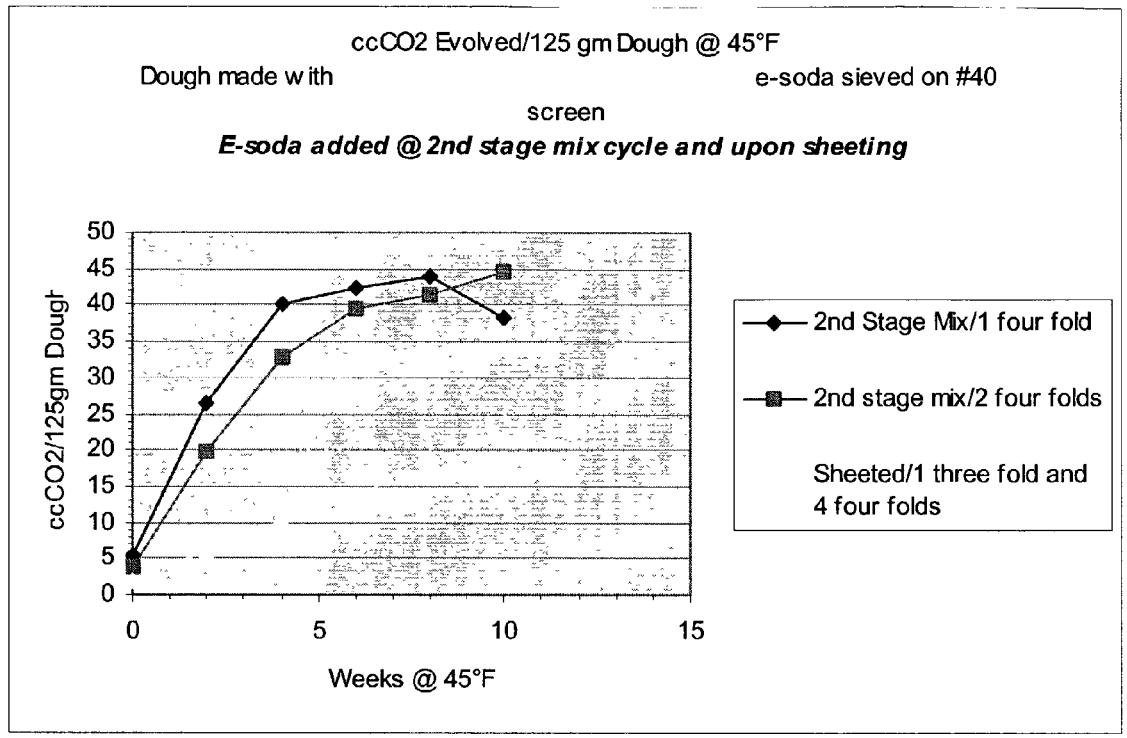
FIG. 7 is a graph illustrating gas evolution of $CO_2$ versus time.

FIG. 7 shows that at the end of the 12 week shelf life evaluation period, dough made with e-soda added during the described second stage mix cycle outgassed approximately 43 cc $CO_2$, while dough made with e-soda added to the dough during the sheeting step outgassed approximately 15 cc $CO_2$. By avoiding shear damage to the encapsulate during mixing, one reduced $CO_2$ outgassing from the biscuit dough by >50%.

Figure 8:
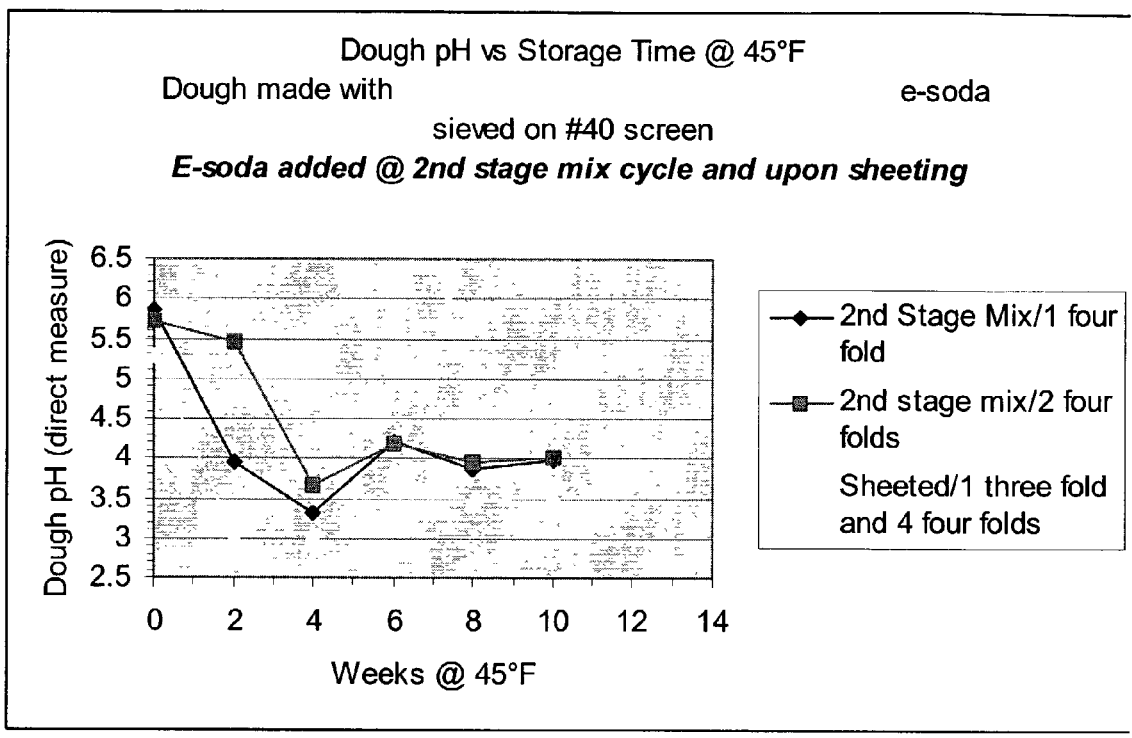
FIG. 8 is a plot of pH versus time for dough compositions.

FIG. 8 shows that dough pH declined most rapidly in the sample in which e-soda was added during the sheeting steps (less encapsulate damage=less soda released=less soda available to neutralize the SALP). The pH of all three dough samples fell to $\leq 4$ within 4 weeks.

Figure 9:
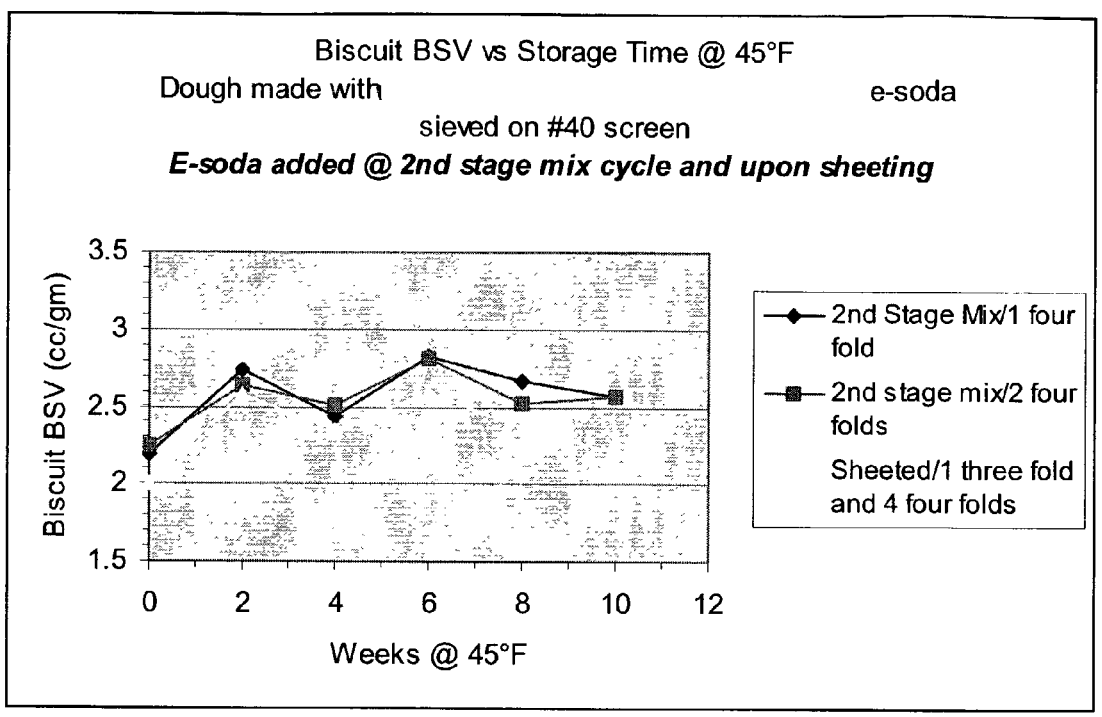
FIG. 9 is a plot of baked specific volume versus time.

FIG. 9 shows that the BSV value for dough in which the e-soda was added during the sheeting step was slightly lower compared to samples in which the e-soda was added during the second stage mix cycle (most notably after 4 weeks storage), but still useful. Additionally, localized regions/layers of yellow spotting were observed in the biscuits made with dough in which the e-soda was added during the sheeting set (spotting associated with high concentrations of undissolved soda particles).

The invention claimed is:

1. A method of preparing a chemically leavened dough composition, the method comprising
    combining dough ingredients into a mixture using a mixer, high speed mixing step, and
    uniformly distributing encapsulated chemical leavening agent particles into the dough ingredients by exposing the encapsulated chemical leavening agent to no more than 160 seconds of high speed mixing to limit the amount of damage that occurs to the encapsulated chemical leavening agent during high speed mixing,
    said combining step comprises combining dough ingredients comprising flour, water, shortening, and non-encapsulated acidic chemical leavening agent by mixing steps containing two mixing stages,
        each mixing stage comprising incorporating at least one dough ingredient, and
        each mixing stage comprising a low speed mixing step and a high speed mixing step, and
    uniformly distributing encapsulated chemical leavening agent into the dough ingredients during a portion of the second stage high speed mixing step.

2. The method of claim 1 comprising, during the first stage, combining non-encapsulated acidic chemical leavening agent with a fat ingredient, and combining the mixture containing non-encapsulated acidic chemical leavening agent and fat ingredient with dough ingredients selected from the group consisting of flour, water, ice, and combinations thereof.

* * * * *